United States Patent
Yoshida et al.

(10) Patent No.: US 7,417,396 B2
(45) Date of Patent: Aug. 26, 2008

(54) MANUAL OPERATION DEVICE FOR AUTOMOTIVE VEHICLE

(75) Inventors: Ichiro Yoshida, Takahama (JP); Hiroshige Asada, Nagoya (JP); Yuuki Sawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 8 days.

(21) Appl. No.: 11/476,904

(22) Filed: Jun. 29, 2006

(65) Prior Publication Data
US 2007/0013335 A1 Jan. 18, 2007

(30) Foreign Application Priority Data
Jul. 4, 2005 (JP) .......................... 2005-195370
May 26, 2006 (JP) .......................... 2006-146788

(51) Int. Cl.
*G05D 3/00* (2006.01)
(52) U.S. Cl. .................... 318/466; 318/486; 701/36; 701/49; 345/161; 345/184
(58) Field of Classification Search ................ 318/486, 318/466; 701/36, 49; 345/161, 184
See application file for complete search history.

(56) References Cited

U.S. PATENT DOCUMENTS

| | | | |
|---|---|---|---|
| 4,625,329 A * | 11/1986 | Ishikawa et al. ............ 382/104 |
| 5,086,510 A * | 2/1992 | Guenther et al. ........... 455/575.9 |
| 5,875,108 A * | 2/1999 | Hoffberg et al. ............... 700/17 |
| 6,587,756 B2 * | 7/2003 | Moriguchi et al. .............. 701/1 |
| 6,593,667 B1 * | 7/2003 | Onodera et al. ............ 307/10.1 |
| 6,850,252 B1 * | 2/2005 | Hoffberg .................... 715/716 |
| 6,885,925 B2 * | 4/2005 | Sanpei et al. ................. 701/36 |
| 6,904,823 B2 * | 6/2005 | Levin et al. ............. 74/471 XY |

FOREIGN PATENT DOCUMENTS

| JP | A-2004-227497 | 8/2004 |
|---|---|---|
| JP | A-2005-135324 | 5/2005 |

* cited by examiner

*Primary Examiner*—Rita Leykin
(74) *Attorney, Agent, or Firm*—Posz Law Group, PLC

(57) ABSTRACT

A manual operation device for controlling an instrument mounted on an automotive vehicle includes: an operating portion to be operated manually; an actuator for applying a force to the operating portion; a detection portion for detecting an operation position of the operating portion; a memorizing element for memorizing a force pattern; a receiving element for receiving the force pattern from an external device and for memorizing the force pattern in the memorizing portion; and a control element for reading out the force pattern memorized in the memorizing portion, for outputting the control data to the actuator on the basis of the read out force pattern and the operation position of the operating portion detected by the detection portion, and for outputting the operation signal to the instrument.

11 Claims, 10 Drawing Sheets

FIG. 7

|  | X0 | X1 | X2 | X3 | X4 | X5 | X6 | X7 |  |
|---|---|---|---|---|---|---|---|---|---|
| | +1<br>−1<br>* | +1<br>0<br>* | +1<br>0<br>* | 0<br>0<br>A-8 | 0<br>0<br>A-8 | −1<br>0<br>* | −1<br>0<br>* | −1<br>−1<br>* | Y7 |
| | 0<br>−1<br>* | +1<br>−1<br>* | +1<br>0<br>* | 0<br>0<br>A-8 | 0<br>0<br>A-8 | −1<br>0<br>* | −1<br>−1<br>* | 0<br>−1<br>* | Y6 |
| | 0<br>−1<br>* | 0<br>−1<br>* | +1<br>−1<br>* | 0<br>0<br>* | 0<br>0<br>* | −1<br>−1<br>* | 0<br>−1<br>* | 0<br>−1<br>* | Y5 |
| | 0<br>0<br>B-3 | 0<br>0<br>B-3 | 0<br>0<br>* | 0<br>0<br>* | 0<br>0<br>* | 0<br>0<br>* | 0<br>0<br>B-5 | 0<br>0<br>B-5 | Y4 |
| | 0<br>0<br>B-3 | 0<br>0<br>B-3 | 0<br>0<br>* | 0<br>0<br>* | 0<br>0<br>* | 0<br>0<br>* | 0<br>0<br>B-5 | 0<br>0<br>B-5 | Y3 |
| | 0<br>+1<br>* | 0<br>+1<br>* | +1<br>−1<br>* | 0<br>0<br>* | 0<br>0<br>* | −1<br>+1<br>* | 0<br>+1<br>* | 0<br>+1<br>* | Y2 |
| | 0<br>+1<br>* | +1<br>+1<br>* | +1<br>0<br>* | 0<br>0<br>A-4 | 0<br>0<br>A-4 | −1<br>0<br>* | −1<br>+1<br>* | 0<br>+1<br>* | Y1 |
| | +1<br>+1<br>* | +1<br>0<br>* | +1<br>0<br>* | 0<br>0<br>A-4 | 0<br>0<br>A-4 | −1<br>0<br>* | −1<br>0<br>* | −1<br>+1<br>* | Y0 |

Y DIRECTION (+ up, − down)

X DIRECTION → +

MANUAL OPERATION DEVICE FOR AUTOMOTIVE VEHICLE

CROSS REFERENCE TO RELATED APPLICATIONS

This application is based on Japanese Patent Applications No. 2005-195370 filed on Jul. 4, 2005, and No. 2006-146788 filed on May 26, 2006, the disclosures of which are incorporated herein by reference.

FIELD OF THE INVENTION

The present invention relates to a manual operation device for integratively operating various instruments mounted on an automotive vehicle.

BACKGROUND OF THE INVENTION

Recently, a system for integratively operating various electric instruments mounted on an automotive vehicle is realized. Specifically, the system operates the instruments such as a navigation device, an air-conditioner and an audio unit in such a manner that information for operating of the instruments is shown on a display, and a passenger in the vehicle operates a button shown on the display performed by, for example, touch panel operation or remote control operation.

However, according to the above system, it is necessary for the passenger to watch the display when the passenger operates the button. Accordingly, when a driver in the vehicle operates the button, a problem arises that it is difficult for the driver to recognize where the button is disposed and what happens to the instrument after the button is operated.

In view of the above problem, a technique disclosed in Japanese Patent Application Publication No. 2001-84875 is well known to solve the problem. This technique relates to a device called a haptic device for controlling a reaction force in accordance with a position of the button and a state of the instrument. Further, the haptic device applies not only the reaction force but also external assist force to an operation direction.

More specifically, when a volume of a radio or a CD player is operated, an operator feels a friction of a manual operation device when the manual operation device is operated to turn up the volume. Further, the operator feels an acceleration of the manual operation device when the manual operation device is operated to turn down the volume. Thus, the external force is applied to the manual operation device. As a result, even when the volume is turned up, it can be avoided that a sound to be outputted to a compartment of the vehicle is rapidly increased. Further, when the operator wants to turn down the volume, the volume can be rapidly reduced. Thus, a problem such as interception of conversation and audio listener is resolved. Further, the above control details are different in each instrument as an object of operation by the manual operation device (e.g., the navigation device, the air conditioner and the audio unit). Furthermore, the manual operation device can switch the object instrument.

However, in the above technique, a problem arises when a user removes the instrument mounted on the vehicle (e.g., a portable navigation device) from the vehicle. For example, when the operator switches the operation object instrument by using the manual operation device, the operation object instrument to be switched does not exist in the vehicle practically. In this case, even when the operator operates the manual operation device to switch to the object operation instrument, nothing happens. Thus, the operator may feel uncomfortable.

Further, when a user changes a regularly used vehicle to another vehicle, the user may feel uncomfortable since a friction force of the manual operation device in the other vehicle is different from that in the regularly used vehicle.

Further, another user drives the vehicle and the other user may change adjustment of the friction force in accordance with his preference just before the user drives the same vehicle. In this case, the user may feel uncomfortable.

SUMMARY OF THE INVENTION

In view of the above-described problem, it is an object of the present invention to provide a manual operation device for operating an instrument without uncomfortable feeling of a user.

According to an embodiment of the present disclosure, a manual operation device for controlling a instrument mounted on an automotive vehicle includes: an operating portion to be operated manually by a user; an actuator as a power source for applying a force to the operating portion; a detection portion for detecting an operation position of the operating portion; a memorizing portion for memorizing a force pattern, which defines a relationship between the operation position of the operating portion and a control data for driving the actuator and a relationship between the operation position of the operating portion and an operation signal to be outputted from the device for controlling the instrument mounted on the vehicle; a receiving portion for receiving the force pattern from an external device and for memorizing the force pattern in the memorizing portion; a control portion for reading out the force pattern memorized in the memorizing portion, for outputting the control data to the actuator on the basis of the force pattern read out from the memorizing portion and the operation position of the operating portion detected by the detection portion, and for outputting the operation signal to the instrument. In the above device, since the force pattern can be inputted to the device from the external device, the user can operate the manual operation device by replacing a preferable force pattern of the user when the preferable force pattern of the user is memorized in the external device. Thus, uncomfortable feeling of the user is reduced.

BRIEF DESCRIPTION OF THE DRAWINGS

The above and other objects, features and advantages of the present invention will become more apparent from the following detailed description made with reference to the accompanying drawings. In the drawings:

FIG. 7 is a table explaining a force pattern;

DETAILED DESCRIPTION OF THE PREFERRED EMBODIMENTS

Embodiments of the present invention are explained as follows.

Description of Construction

Figure 1:
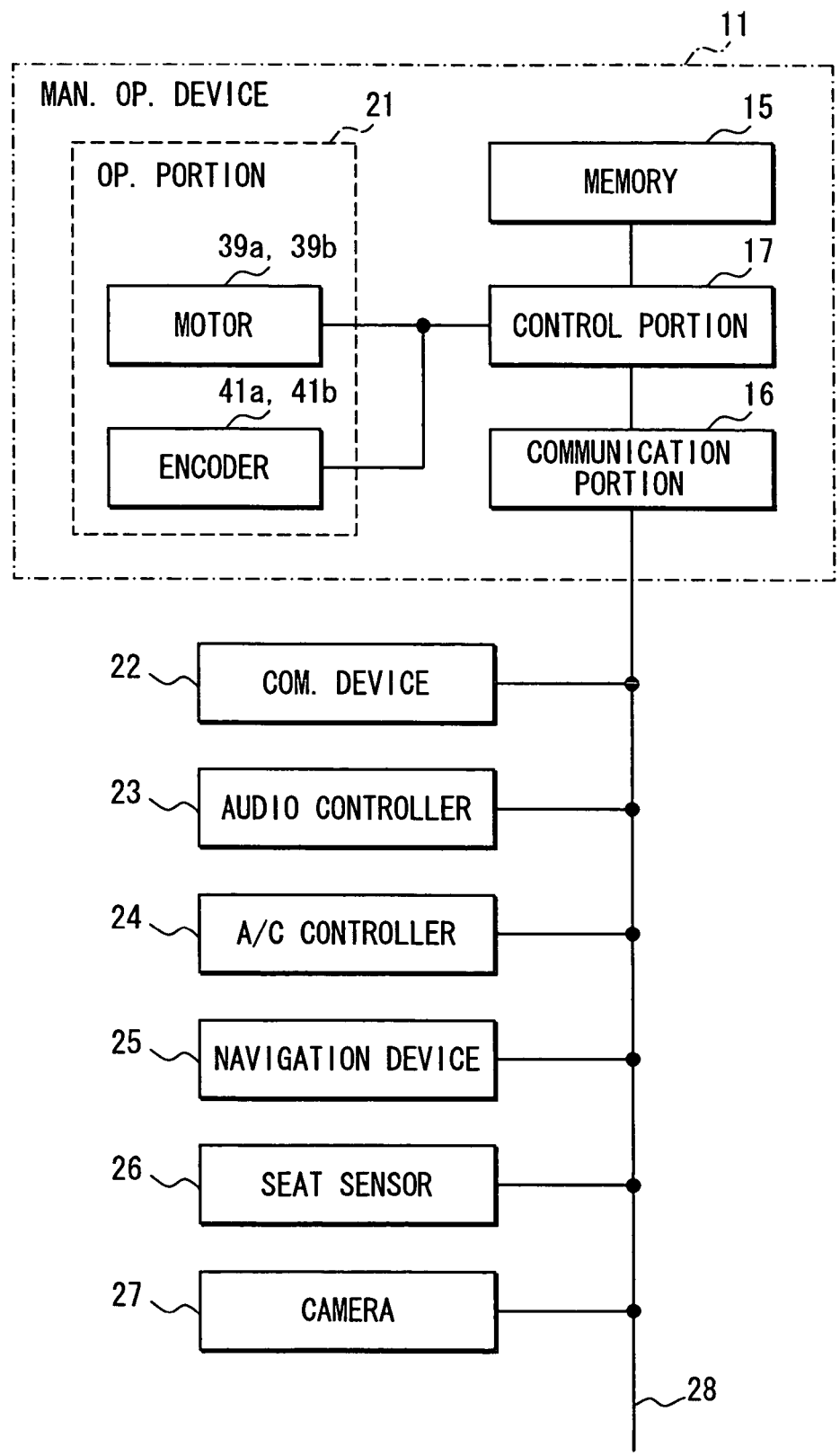
FIG. 1 is a block diagram showing a main constitution of a manual operation device.

FIG. 1 is block diagram showing a main part of a manual operation device 11 and instruments connecting to the manual operation device 11. The manual operation device 11 includes an operating portion 21, a memorizing portion 15, a communication portion 16 and a control portion 17. The communication portion 16 is connected to a communicating device 22, an audio unit controller 23, an air conditioner controller 24, a navigation device 25, a seat sensor 26 and a compartment camera 27 through an in-vehicle LAN 28. Here, the manual operation device 11 is disposed near a driver's seat of the vehicle so that a driver can operate the device 11 in a state where the driver sits down the driver's seat.

The operating portion 21 is a portion operated by a user. Electric motors 39a, 39b and encoders 41a, 41b are accommodated in the operating portion 21.

The electric motor 39a, 39b is a portion for applying a force to the operating portion 21 on the basis of a control data inputted from the control portion 17.

The encoder 41a, 41b is a sensor for detecting an operation state (i.e., an operation position) of the operating portion 21.

The memorizing portion 15 is a portion for memorizing a force pattern, an image recognition data (i.e., a data necessary to specify a driver by using an image recognition technique) and the like. The force pattern is a set of values showing a relationship between an operation state of the operating portion 21 and a control data to drive the electric motors 39a, 39b and values showing a relationship between the operation state of the operating portion 21 and a signal to operate a instrument (e.g., an audio unit, an air conditioner and a navigation device) mounted on the vehicle. The force pattern is correlated with information for specifying the driver, and prepared in each driver.

The communication portion 16 is a portion for communicating various instruments through the in-vehicle LAN 28, the instruments being connected to the in-vehicle LAN 28.

The control portion 17 is composed of a CPU, a ROM, a RAM and the like, and is a portion for executing various processes on the basis of a program memorized in a ROM.

The in-vehicle LAN 28 is a LAN networking in the vehicle. The instruments (e.g., the communicating device 22, the audio unit controller 23, the air conditioner controller 24, the navigation device 25, the seat sensor 26, the compartment camera 27 and the like) connected to the LAN 28 mutually communicate each other.

The communicating device 22 is a communicating device for communicating a cellular phone, a PDA or the like. In this embodiment, the communicating device 22 performs communication on the basis of Bluetooth Standard (which is a registered brand).

The audio unit controller 23 is a controller for controlling an audio unit, which is not shown.

The air conditioner controller 24 is a controller for controlling an air conditioner, which is not shown.

The navigation device 25 includes a display, a disk for a map, a GPS receiver and the like, which are not shown. The navigation device 25 shows a current position of the vehicle and the map on the display, and performs routing assistance and the like.

The seat sensor 26 is a sensor for detecting the driver on the seat. The seat sensor 26 is a pressure sensor disposed on a seat surface of the driver's seat.

The compartment camera 27 is a camera accommodated in an inside rear view mirror of the vehicle. The compartment camera 27 mainly takes an image of a face of the driver.

Figure 2:
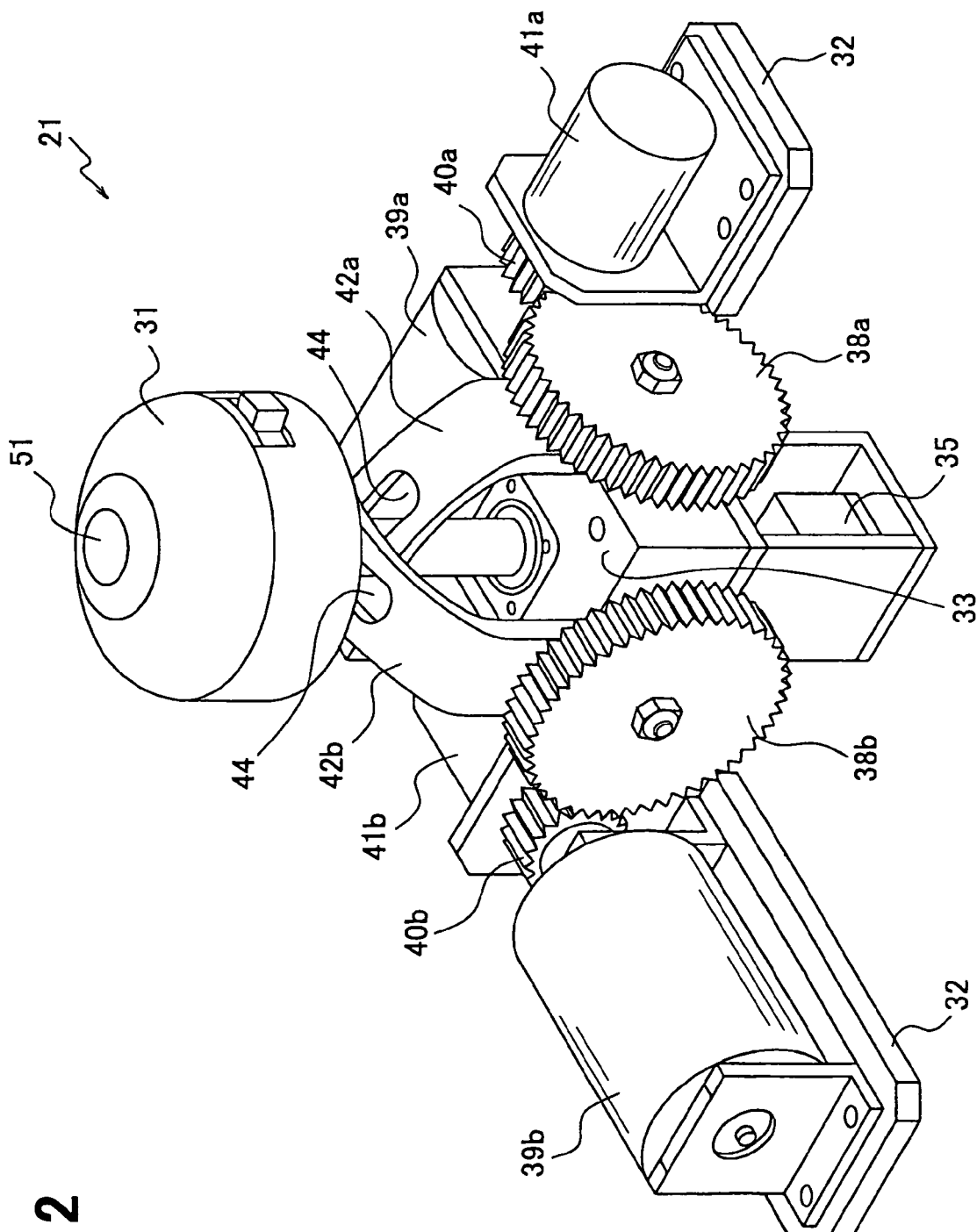
FIG. 2 is a perspective view showing an operating portion.
Figure 3:
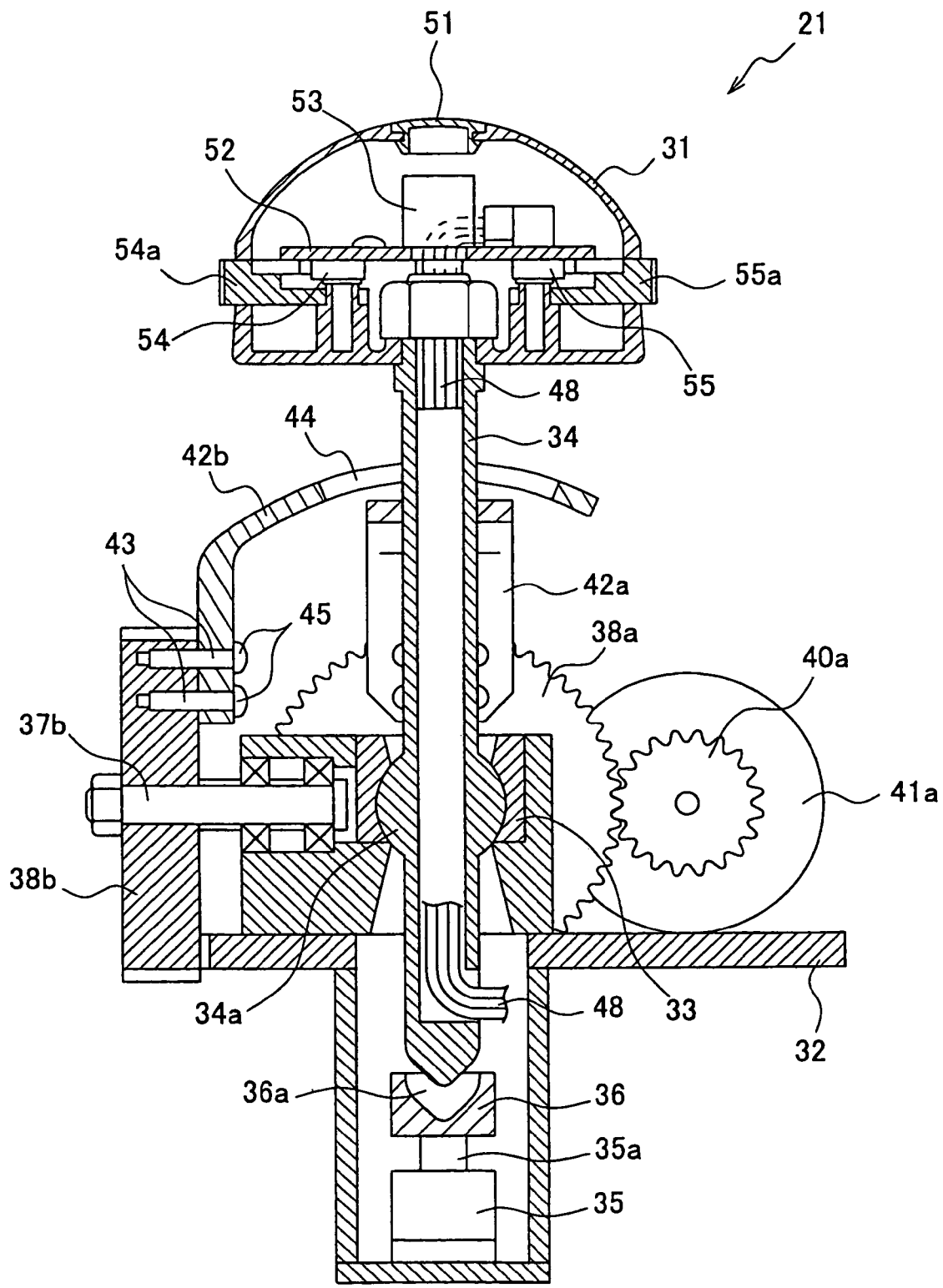
FIG. 3 is a cross sectional view showing a main part of the operating portion seeing from a side direction.
Figure 4:
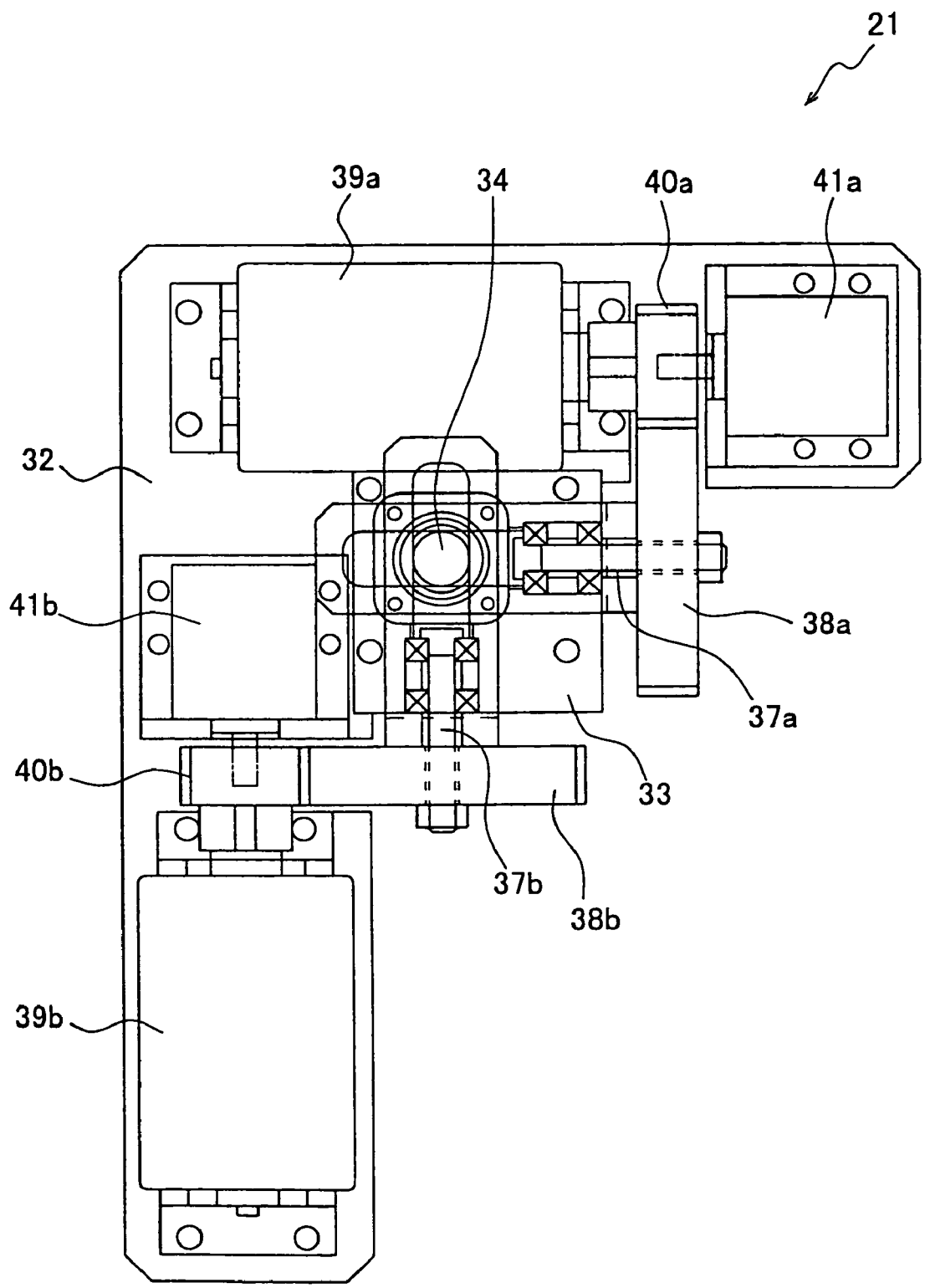
FIG. 4 is a cross sectional view showing the main part of the operating portion seeing from a top direction.
Figure 5:
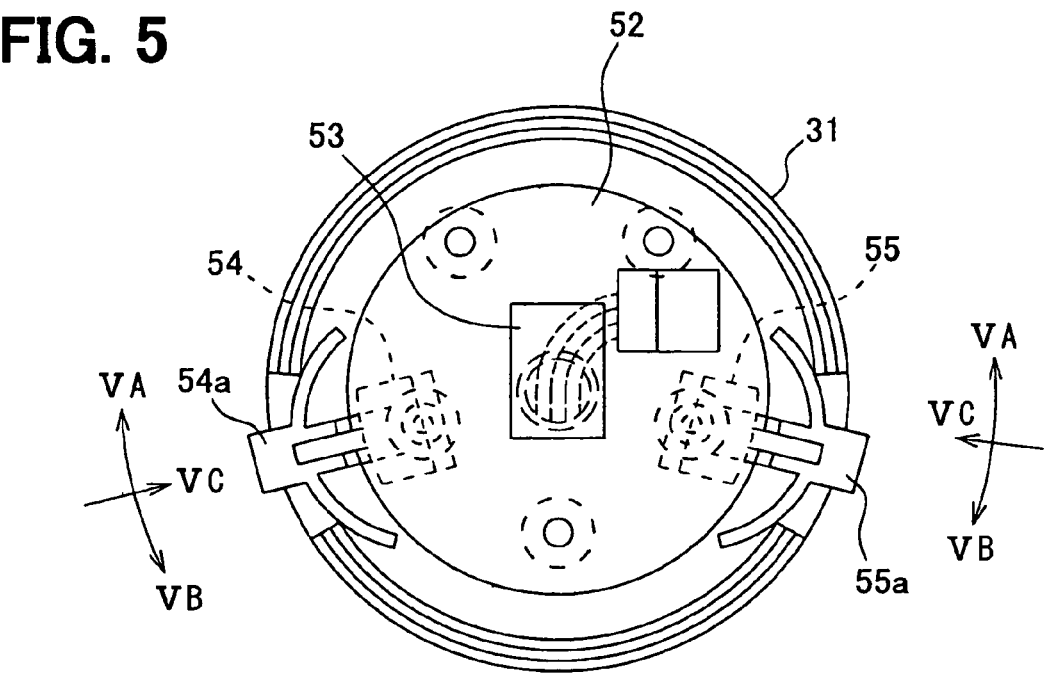
FIG. 5 is a plan view showing the operating portion without an operating handle seeing from the top.

Next, details of a construction of the operating portion 21 are described. FIG. 2 is a perspective view showing the operating portion 21. FIG. 3 is a cross sectional view showing a main part of the operating portion 21 seeing from a side direction. FIG. 4 is a cross sectional view showing the main part of the operating portion 21 seeing from a top, and FIG. 5 is a plan view showing the operating portion 21 without an operation handle 31 seeing from the top.

As shown in FIGS. 2 to 5, the operating portion 21 includes a base 32, a spherical bearing 33, an operating rod 34, a solenoid 35, a clamp member 36 of the operating rod 34, two rotation shafts 37a, 37b, two large gears 38a, 38b, two electric motors 39a, 39b, two small gears 40a, 40b, two encoders 41a, 41b, and two L-shaped members 42a, 42b. The base 32 is attached to a body of the vehicle. The spherical bearing 33 is formed on the base 32. The operating rod 34 includes a spherical portion 34a disposed on a lower portion of the rod 34 from a center portion of the rod 34. The spherical portion 34a of the rod 34 is movably supported on the spherical bearing 33. The solenoid 35 is disposed on a lower side of the spherical bearing 33. The clamp member 36 is attached to an upper portion of a driving rod 35a of the solenoid 35. The rotation shafts 37a, 37b intersect perpendicularly in a plane parallel to the base 32, and an intersection is disposed on an axis as a center of the spherical bearing 33. Each large gear 38a, 38b is fixed to a top of the rotation shaft 37a, 37b, respectively. Each electric motor 39a, 39b is disposed in parallel to the rotation shaft 37a, 37b. Each small gear 40a, 40b is fixed to a main shaft of the electric motor 39a, 39b, respectively. Each small gear 40a, 40b engages the large gear 38a, 38b, respectively. Each encoder 41a, 41b detects a rotation direction and a rotation amount of the main shaft of the electric motor 39a, 39b, respectively. Each L-shaped member 42a, 42b converts movement of the operating rod 34 to a rotation so that the L-shaped member transmits the movement to the rotation shaft 37a, 37b, respectively. The operation handle 31 is mounted on the top of the operating rod 34.

The lower portion of the operating rod 34 has a circular cone shape, which tapers toward the bottom. The top of the clamp member 36 facing the lower portion of the operating rod 34 has a concavity 36a having a substantially circular cone shape, in which the bottom end of the operating rod 34 is capable of inserting. Accordingly, when the solenoid 35 switches on so that the clamp member 36 moves upward, a top end of the operating rod 34 is inserted into a concavity 36a. Thus, the operating rod 34 is clamped, and is restricted to be movable around the spherical portion as a center. On the other hand, when the solenoid 35 switches off so that the clamp member 36 moves downward, the operating rod 34 is released from engagement with the clamp member 36. Thus, the opening rod 34 is movable around the spherical portion as a center.

A screw hole 43 is formed on one side of the L-shaped member 42a, 42b, and a through hole 44 for the operating rod 34 is formed on the other side of the L-shaped member 42a, 42b. The through hole 44 has an elongated shape. As shown in FIG. 3, the one side of the L-shaped member 42a, 42b is screwed on a side of the large gear 38a, 38b with a screw 45 inserted into the screw hole 43 under a condition where the operating rod 34 penetrates through the through hole 44 for the operating rod 44. A width of the through hole 44 for the operating rod 34 is set to be substantially equal to a diameter of the operating rod 34 in a range that the operating rod 34 is smoothly movable so that backlash between the operating rod 34 and the through hole 44 becomes minimum. A length of the through hole 44 for the operating rod 34 is set to be equal to or larger than a movable range of the operating rod 34. Accordingly, when the user holds the operation handle 31 and moves the operating rod 34 from a center position, each L-shaped member 42a, 42b is rotated with a rotation amount in accordance with a X-direction component and a Y-direction component. Then, the rotation of the L-shaped member 42a, 42b is transmitted to each encoder 41a, 41b through the large gear 38a, 38b and the small gear 40a, 40b. Thus, the operation of the operating rod 34 is detected by the control portion 17.

As shown in FIGS. 3 and 5, the operation handle 31 is formed to have a dome shape including a transparent window 51, which is disposed on a top center portion of the operation handle 31. A circuit board 52, a photo interrupter 53 and first and second switches 54, 55 are disposed inside of the operation handle 31. The photo interrupter 53 is composed of a light emitting device and a light receiving device, which are mounted on a portion of the circuit board 52 opposite to the transparent window 51. The switches 54, 55 are mounted on a periphery portion of the circuit board 52.

The photo interrupter 53 controls to turn on and off the solenoid 35. The photo interrupter 53 emits a light having a specific wavelength such as an infrared light from the light emitting device, which is not shown. When the light receiving device, which is not shown, receives the light having the specific wavelength, the photo interrupter 53 controls to turn on the solenoid 35 so that the clamp member 36 moves downward. Thus, engagement between the clamp member 36 and the operating rod 34 is released so that the operating rod 34 is capable of being operated movably. Here, power supply to the photo interrupter 53 and signal transmission from the photo interrupter 53 are performed through a wiring 48, which is inserted in the operating rod 34.

The first and second switches 54, 55 have functions for switching operation of rotation detection and for switching operation of press detection, respectively. When the switches 54, 55 are not operated, a knob is disposed in a center position. A first knob 54a functions for operating the first switch 54, and a second knob 55a functions for operating the second switch 55. As shown in FIG. 5, the first and second knobs 54a, 55a are arranged to have a left-right symmetry, and disposed on an outer circumferential surface of the operating rod 31. The knobs 54a, 55a can be rotatable from the center position along with the outer circumferential surface of the operating rod 31 in a direction shown as an arrow VA or an arrow VB. Further, the knobs 54a, 55a can be pressed in a direction shown as an arrow VC. The first and second switches 54, 55 are constructed to execute predetermined functions by operating the first and second knobs 54a, 55a in various operational directions.

The electric motor 39a, 39b functions for adding resistance to operation of the operation handle 31, respectively. For example, the electric motor 39a, 39b provides a limitation of the operating direction of the operation handle 31, a limitation of the operating speed in accordance with operating amount of the operation handle 31, a limitation of a stop point of the operation handle 31 and the like. Specifically, the operation handle 31 functions to select an electric instrument mounted on the vehicle as a limitation object and to control functions of the selected electric instrument mounted on the vehicle by being displaced in a specific direction. Accordingly, if the operation handle 31 is not accurately operated in a predetermined direction, selection of the electric instruments mounted on the vehicle and function control of the instrument are not performed accurately. Thus, the user can operate the operation handle 31 toward the predetermined direction with small operational force. However, when the user operates the operation handle 31 toward other directions other than the predetermined direction, a torque toward a direction opposite to the operating direction is applied to the operating rod 34 by driving the electric motor 39a, 39b so that the resistance is added to the operation handle 31. Thus, the user (i.e., the driver) recognizes sensuously that the user operates the operation handle 31 in an unexpected direction. Thus, the device prevents from occurring incorrect selection of the electric instruments mounted on the vehicle and incorrect operation control of the instruments.

When the restriction means for limiting operational range of the operation handle 31 is provided by a mechanical method such that the operating rod 34 is shock-engaged to an edge of the spherical bearing 33, a large mechanical force is applied to a shock-engagement portion between the operating rod 34 and the spherical bearing 33 in each operation of the operation handle 31. The large mechanical force provides frictional abrasion. Thus, abrasion powder may penetrate between the spherical bearing 33 and the spherical portion 34a of the operating rod 34, so that a necessary operating force of the operating rod 34 becomes larger. If the worst happens, the operating rod 34 cannot be movable. Thus, when the operation handle 31 is operated to reach a predetermined position, the electric motor 39a, 39b is driven so that, for example, an impact torque is applied to the operating rod 34 in a direction opposite to the operating direction. Thus, the user (i.e., the driver) recognizes sensuously that the user operates the operation handle 31 by an operation limit. The user stops to operate the operation handle 31 any more. Accordingly, shock-engagement between the edge of the spherical bearing 33 and the operating rod 34 is prevented from occurring, so that the above problem caused by the abrasion powder is prevented from occurring. Further, the operation handle 31 automatically returns to the center position by using the torque of the electric motor 39a, 39b. Thus, operability of the operation handle 31 is much improved.

Next, the control portion 17 and the memorizing portion 15, which constitute the manual operation device 11, are explained with reference to a block diagram (i.e., FIG. 6), which is more particular than FIG. 1.

Figure 6:
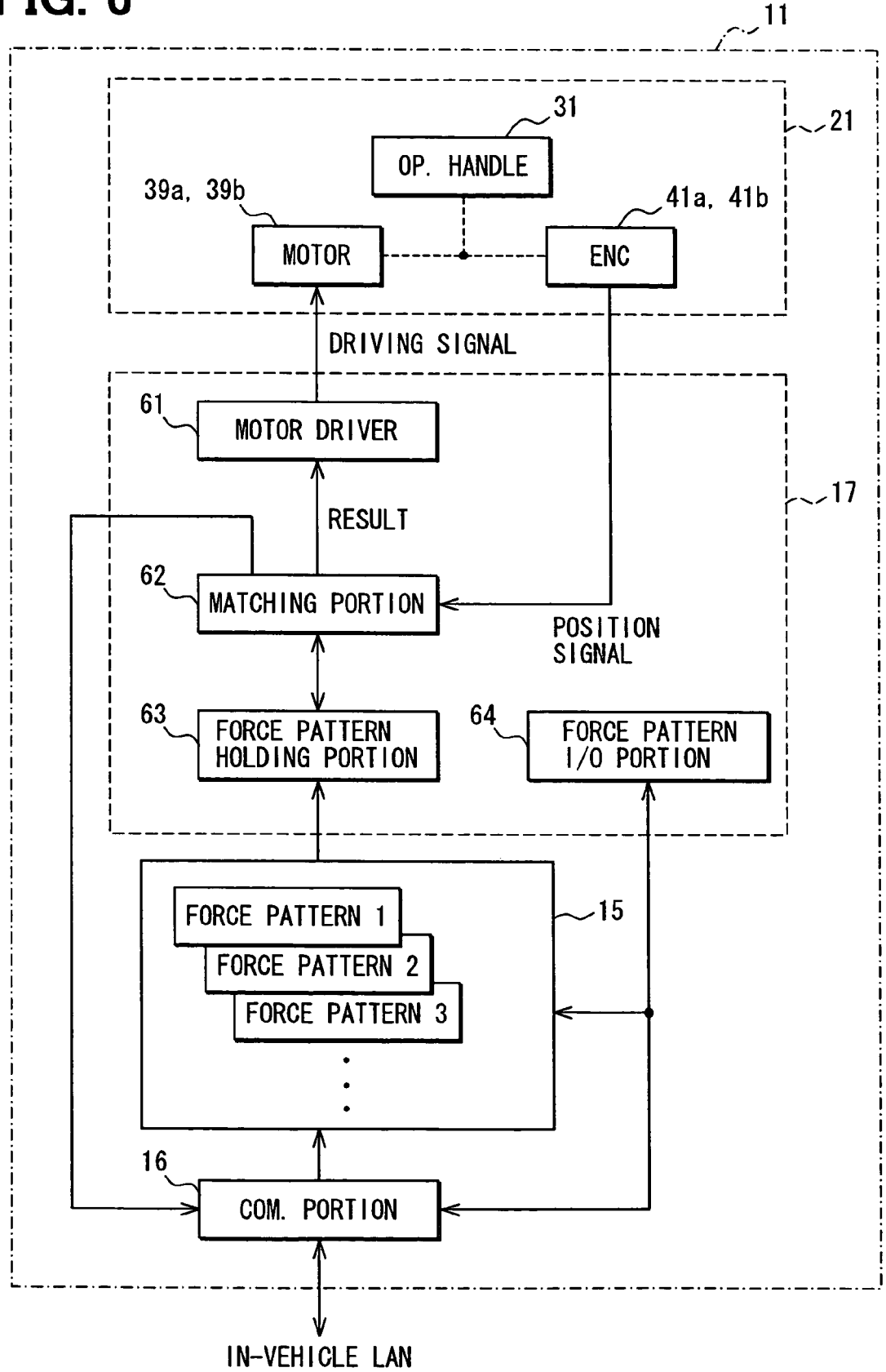
FIG. 6 is a flow chart showing details of the manual operation device.

As shown in FIG. 6, the control portion 17 includes a motor driver 61, a matching portion 61, a force pattern holding portion 61 and a force pattern input/output portion 64. Here, these portions are logical function blocks, and practically provided by a CPU, a ROM, a RAM, an I/O element and the like, which are not shown in FIG. 6.

The motor driver 61 outputs a driving signal for driving the electric motor 39a, 39b on the basis of a result (i.e., a motor output power) outputted from the matching portion 62.

The matching portion 62 checks a force pattern held in the force pattern holding portion 63 with a position signal outputted from the encoder 41a, 41b, and determines a result (i.e., a motor output power) to be outputted to the motor driver 61.

The force pattern holding portion 63 holds only one set of the force pattern inputted from the memorizing portion 15, and the matching portion 62 is capable of referring the force pattern in the holding portion 63.

The force pattern input/output portion 64 transmits the force pattern memorized in the memorizing portion 15 to an external circuit through the communication portion 16, and further, receives a force pattern from the external circuit through the communication portion 16 so that the force pattern is memorized in the memorizing portion 15.

The memorizing portion 15 memorizes multiple sets of the force patterns therein. Here, one set of the force pattern among multiple sets is explained specifically with reference to the table in FIG. 7. In the table shown in FIG. 7, a movable range of the operation handle 31 in the X direction is divided equally into eight parts, and the movable range in the Y direction is also divided equally into eight parts. In each cell, which is divided equally, drive and stop information and a rotating direction are shown as a code when the manual operation device is operated. A sign and a numeral described in each cell represent such that an upper row shows drive and stop information and a rotating direction of the first electric motor 39a, a middle row shows drive and stop information and a rotating direction of the second electric motor 39b. A sign "+" shows normal rotation of the motor, and a sign "−" shows reverse rotation of the motor. A number "0" shows that the electric motor 39a, 39b does not rotate, and a number "1" shows that the electric motor 39a, 39b rotates. Further, a lower row shows a sign (i.e., "A" or "B") and a control signal (i.e., "3" or "8") for identifying the instrument as an operation object. Here, a sign "*" shows that no instrument as an operation object is defined.

According to this table, when the operation handle 31 is operated in a range between (X3, Y0) and (X3, Y7), a range between (X4, Y0) and (X4, Y7), a range between (X0, Y3) and (X7, Y3), or a range between (X0, Y4) and (X7, Y4), the electric motors 39a, 39b do not rotate so that resistance caused by rotation of the electric motors 39a, 39b is not applied to the operation handle 31. When the operation handle 31 is operated in another range other than the above ranges, at least one of the electric motors 39a, 39b rotates so that the resistance caused by rotation of the electric motors 39a, 39b is applied to the operation handle 31. For example, when the operation handle 31 is disposed in a range between (X3, Y0) and (X3, Y1) or a range between (X4, Y0) and (X4, Y1), a control signal of "4" is outputted to the instrument corresponding to the sign "A" through the communication portion 16. Although not shown in FIG. 7, each force pattern includes information for identifying the force pattern and information for specifying the user, which corresponds to the force pattern.

[Explanation of Operation]

Next, operation of the manual operation device 11 is explained.

(1) Operating Portion Control Process

Figure 8:
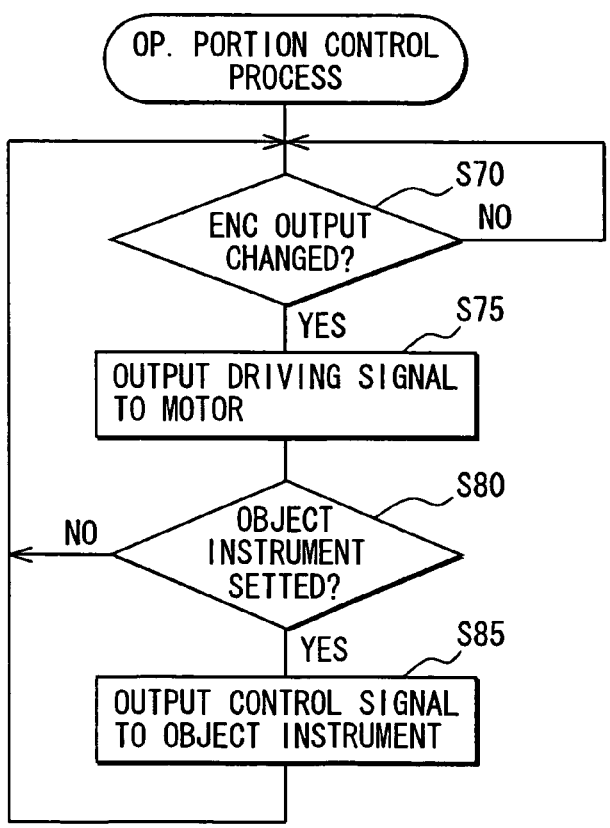
FIG. 8 is a flow chart explaining a control process of the operating portion.

An operating portion control process, which is executed by the control portion 17, is explained with reference to a flow chart shown in FIG. 8. This process is a process, which starts to execute when electricity is supplied to the manual operation device 11, and mainly the matching portion 62 performs many steps.

Firstly, the matching portion 62 determines whether output of the encoder 41a, 41b changes or not (Step S70). When the matching portion 62 determines that output of the encoder 41a, 41b changes (i.e., "Yes" in Step S70), the process proceeds to Step S75. When the matching portion 62 determines that output of the encoder 41a, 41b does not change (i.e., "No" in Step S70), Step S70 is repeated.

In Step S75, to which it goes when the output of the encoder 41a, 41b changes, the matching portion 62 checks the force pattern held in the force pattern holding portion 63 so that an output value to the electric motor 39a, 39b, which corresponds to a position signal of the encoder 41a, 41b, is specified. Then, the motor driver 61 drives the electric motor 39a, 39b in accordance with the output value.

Next, the matching portion 62 determines whether a code relating to the operation object instrument is defined or not in a cell corresponding to the position signal of the encoder 41a, 41b in the force pattern (Step S80). This is a step for determining whether a data such as a sign "A-8" is defined in a lower row of a corresponding cell in FIG. 7. When the matching portion 62 determines that the sign relating to the operation object instrument is defined (i.e., "Yes" in Step S80), the process proceeds to Step S85. When the matching portion 62 determines that the sign relating to the operation object instrument is not defined (i.e., "No" in Step S80), the process returns to Step S70.

In Step S85, to which it goes when the matching portion 62 determines that the sign relating to the operation object instrument is defined, the matching portion 62 transmits the control signal to the operation object instrument corresponding to the sign through the communication portion 16. Then, the process returns to Step S70.

Thus, the operating portion control process is explained above. The process from Step S70 to Step S85 is performed within 10 milliseconds.

(2) Transmit of Force Pattern

Figure 9:
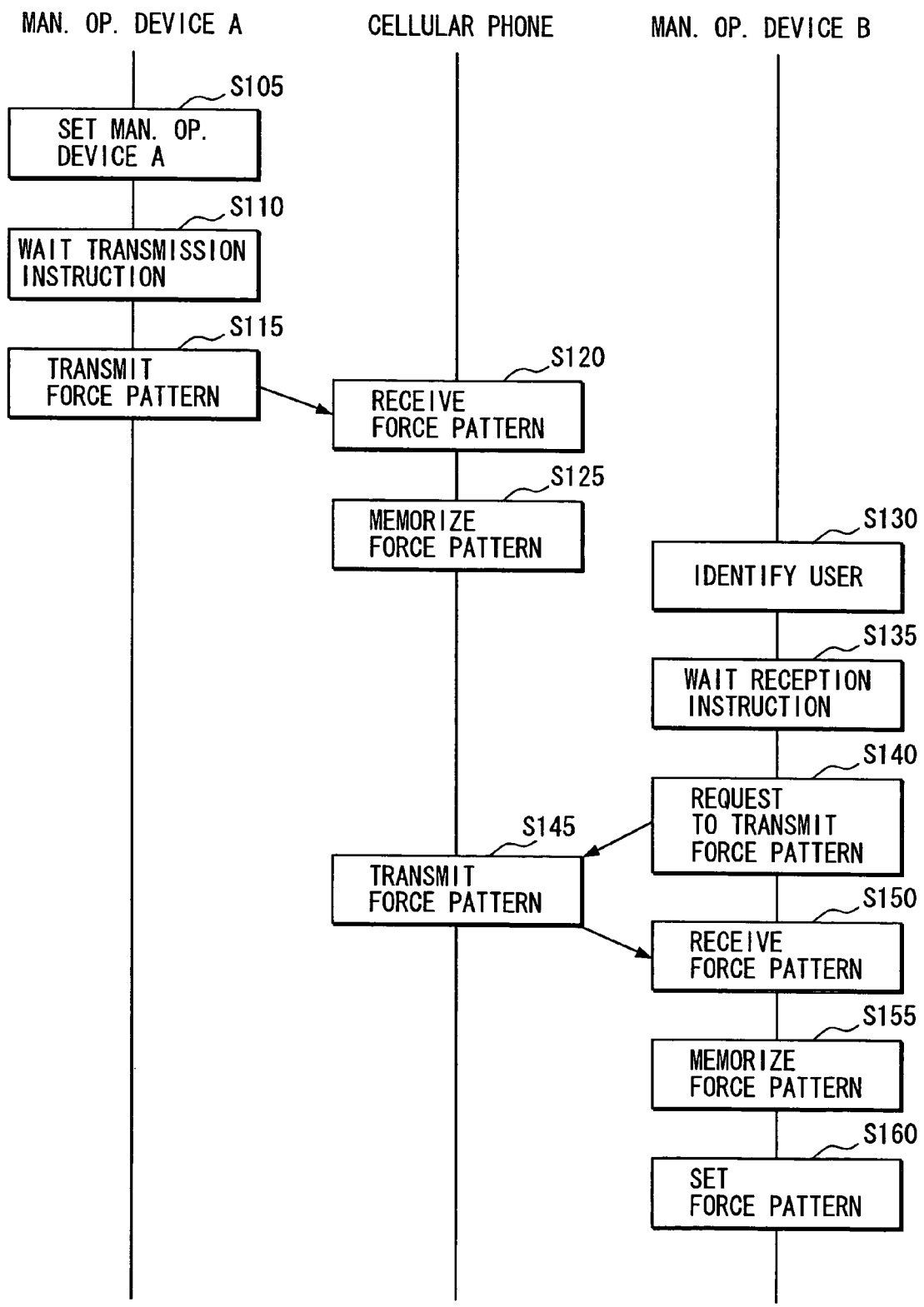
FIG. 9 is a ladder chart explaining transfer of the force pattern.

Next, a step of reading out a force pattern from a manual operation device A, and a step of memorizing the force pattern in a manual operation device B are explained with reference to a ladder chart of FIG. 9.

In the manual operation device A, reaction force characteristics and function allocation (i.e., a relationship between a position of the operation handle 31 and a function of a instrument corresponding to the position of the operation handle 31) are set, so that they are memorized as a force pattern in the memorizing portion 15 (Step S105). Under this condition, the driver inputs a transmission instruction of the force pattern (Step S110). The force pattern is read out from the memorizing portion 15, and then, the force pattern is transmitted to a cellular phone through the communicating device 22 by using Bluetooth Standard communication (which is a registered brand) (Step S115).

Then, the cellular phone receives the force pattern from the manual operation device A (Step S120). The received force pattern is memorized in a built-in memory of the cellular phone (Step S125).

After that, in the manual operation device B, the driver is identified in a step of identifying a user when the driver sits down a driving seat (Step S130). The driver inputs an instruction for obtaining the force pattern corresponding to the identified driver from the cellular phone (Step S135). Then, the device B requests the cellular phone to transmit the force pattern (Step S140).

The cellular phone requested to transmit the force pattern transmits the force pattern to the manual operation device B (Step S145).

The manual operation device B receives the force pattern transmitted from the cellular phone (Step S150). The received force pattern is memorized in the memorizing portion 15 (Step S155). Then, the force pattern is inputted into the force pattern holding portion 63 in the control portion 17, and the device B starts to control the electric motor 39a, 39b (Step S160).

Thus, the force pattern memorized in the manual operation device A is transmitted to the manual operation device B through the cellular phone. Accordingly, maneuvering felling and usability of the manual operation device B are obtained, which are similar to the manual operation device A.

(3) Force Pattern Memory Process

Figure 10:
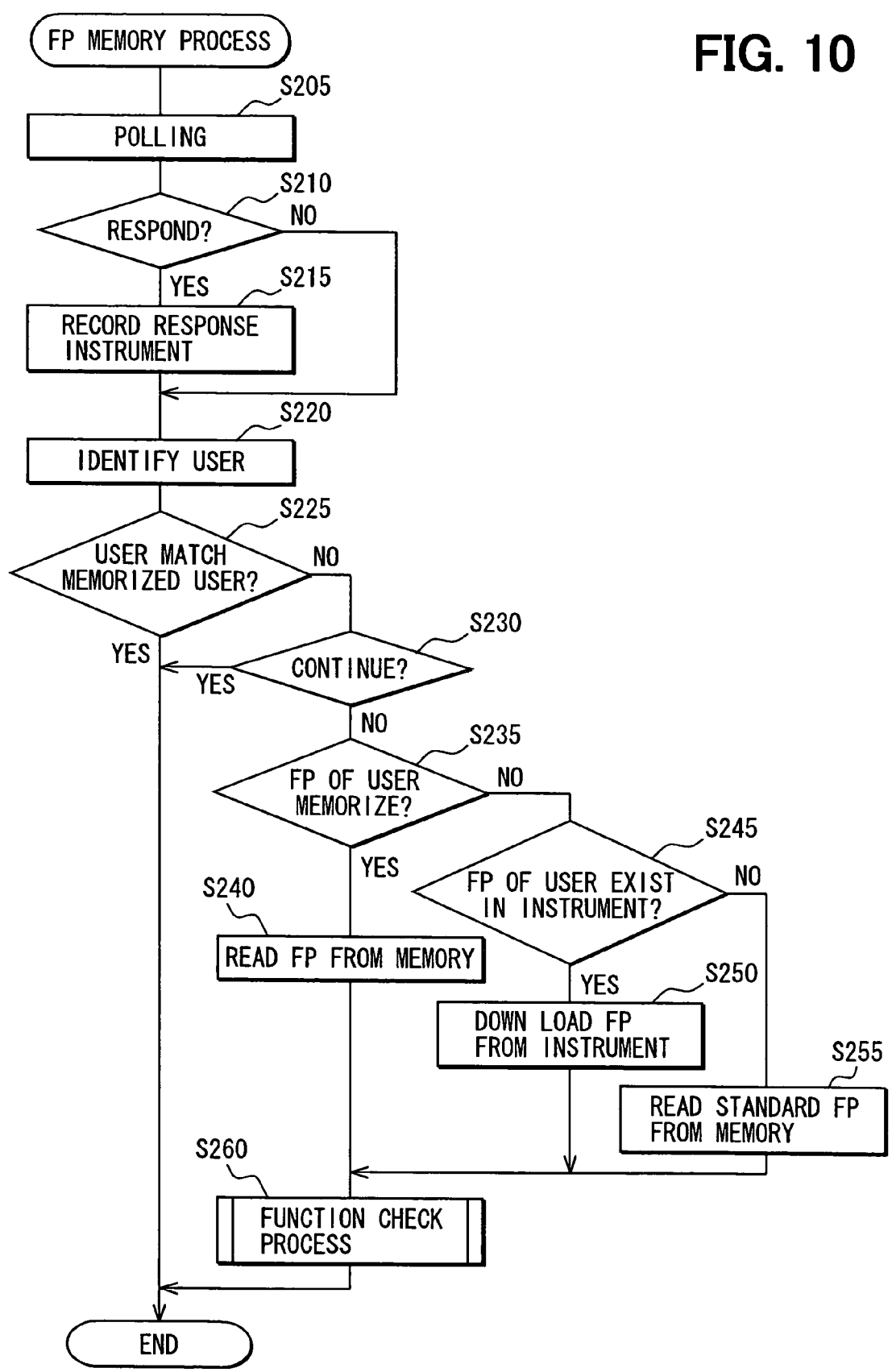
FIG. 10 is a flow chart explaining a memorizing process of the force pattern.

Next, a force pattern memory process to be executed by the control portion 17 is explained with reference to a flow chart of FIG. 10. Here, a part of the force pattern memory process corresponds to Steps S130 to S160 of the manual operation device B in the ladder chart of FIG. 9. This force pattern memory process is a process, execution of which is started when the driver sits down the driving seat (i.e., when the seat sensor 26 detects seating of the driver). Mainly the force pattern input/output portion 64 performs many steps.

Firstly, the force pattern input/output portion 64 executes a polling (Step S205). This polling is a step of requesting an instrument to respond, the instrument capable of communicating through the communicating device 22 by using Bluetooth Standard communication (which is a registered brand).

Then, it is determined on the basis of a result of polling whether a responding instrument exists or not (Step S210). When it is determined that the responding instrument exists (i.e., "Yes" in Step S210), the responding instrument is registered in a RAM of the control portion 17 (Step S215). Then, the process proceeds to Step S220.

On the other hand, when it is determined that the responding instrument does not exist (i.e., "No" in Step S210), the process proceeds to Step S220.

In Step S220, the force pattern input/output portion 64 identifies the user. This is performed such that the portion 64 specifies a person who sits down the driving seat by using image recognition technique on the basis of the image captured by the compartment camera 27. The necessary information for specifying the person is preliminarily memorized in the memorizing portion 15 or the like. Alternatively, the identification of the person may be performed by inputting a user ID by the driver.

Then, the force pattern input/output portion 64 determines whether the user corresponding to the force pattern currently held in the force pattern holding portion 63 coincides with the user identified in Step S220 (Step S225). In Step S225, when the portion 64 determines that the user corresponding to the force pattern currently held in the force pattern holding portion 63 coincides with the user identified in Step S220 (i.e., "Yes" in Step S225), the present process (i.e., the force pattern memory process) is ended. In this case, the force pattern currently held in the force pattern holding portion 63 is utilized continuously. On the other hand, when the portion 64 determines that the user corresponding to the force pattern currently held in the force pattern holding portion 63 does not coincide with the user identified in Step S220 (i.e., "No" in Step S225), the process proceeds to Step S230.

In Step S230, it is inquired to the driver whether the force pattern currently held in the force pattern holding portion 63 is utilized continuously or not. This inquiry is performed such that a voice data is inputted to the audio unit controller 23 so that an audio unit outputs the voice data such as "Do you continue to use the force pattern set at the present time?" The encoder 41a, 41b detects a condition of the operating portion 21, which is operated by the driver, and intention of the driver is determined on the basis of the detected condition.

As a result, when it is determined that the driver shows the intention to continue to use the force pattern, which is held in the force pattern holding portion 63 at the present time, the present process (i.e., the force pattern memory process) is ended. Here, in this case, the force pattern held in the force pattern holding portion 63 at the present time is continuously used. On the other hand, when it is determined that the driver shows the intention not to continue to use the force pattern, which is held in the force pattern holding portion 63 at the present time, the process proceeds to Step S235.

In Step S235, it is determined whether the force pattern corresponding to the driver identified in Step S220 exists in the memorizing portion 15 or not (Step S235).

In Step S235, when it is determined that the force pattern corresponding to the driver exists in the memorizing portion 15 (i.e., "Yes" in Step S235), the corresponding force pattern is read out from the memorizing portion 15, and inputted into the force pattern holding portion 63 (Step S240). Then, the process proceeds to Step S260. On the other hand, when it is determined that the force pattern corresponding to the driver does not exist in the memorizing portion 15 (i.e., "No" in Step S235), the process proceeds to Step S245.

In Step S245, it is determined whether the force pattern corresponding to the driver identified in Step S220 is memorized in the instrument, which responds in Step S215. This determination is performed such that inquiry to the responded instrument is performed through the communicating device 22. When no instrument responds in Step S215, the process proceeds to Step S255 without any condition.

In Step S245, when it is determined that the force pattern corresponding to the driver identified in Step S220 is memorized in the instrument responded in Step S215 (i.e., "Yes" in Step S245), the corresponding force pattern is read out from the responded instrument, and memorized in the memorizing portion 15. Further, the corresponding force pattern is inputted into the force pattern holding portion 63 (Step S250). Then, the process proceeds to Step S260.

On the other hand, in Step S245, when it is determined that the force pattern corresponding to the driver identified in Step S220 is not memorized in the instrument responded in Step S215 (i.e., "No" in Step S245), the process proceeds to Step S255.

In step S255, a standard force pattern preliminarily memorized in the memorizing portion 15 is inputted into the force pattern holding portion 63, and then, the process proceeds to Step S260.

In Step S260, which continues from Steps S240, S250 and S255, a function check process is executed. Then, the present process (i.e., the force pattern memory process) is ended. This function check process is describe later.

By executing the above process, the force pattern of a vehicle, which is familiar to the user, can be transferred to another vehicle easily. Therefore, even when the driver drives a vehicle for the first time, uncomfortable feeling of the user regarding operation of the operating portion 21 in the vehicle is reduced.

(4) Function Check Process

Figure 11:
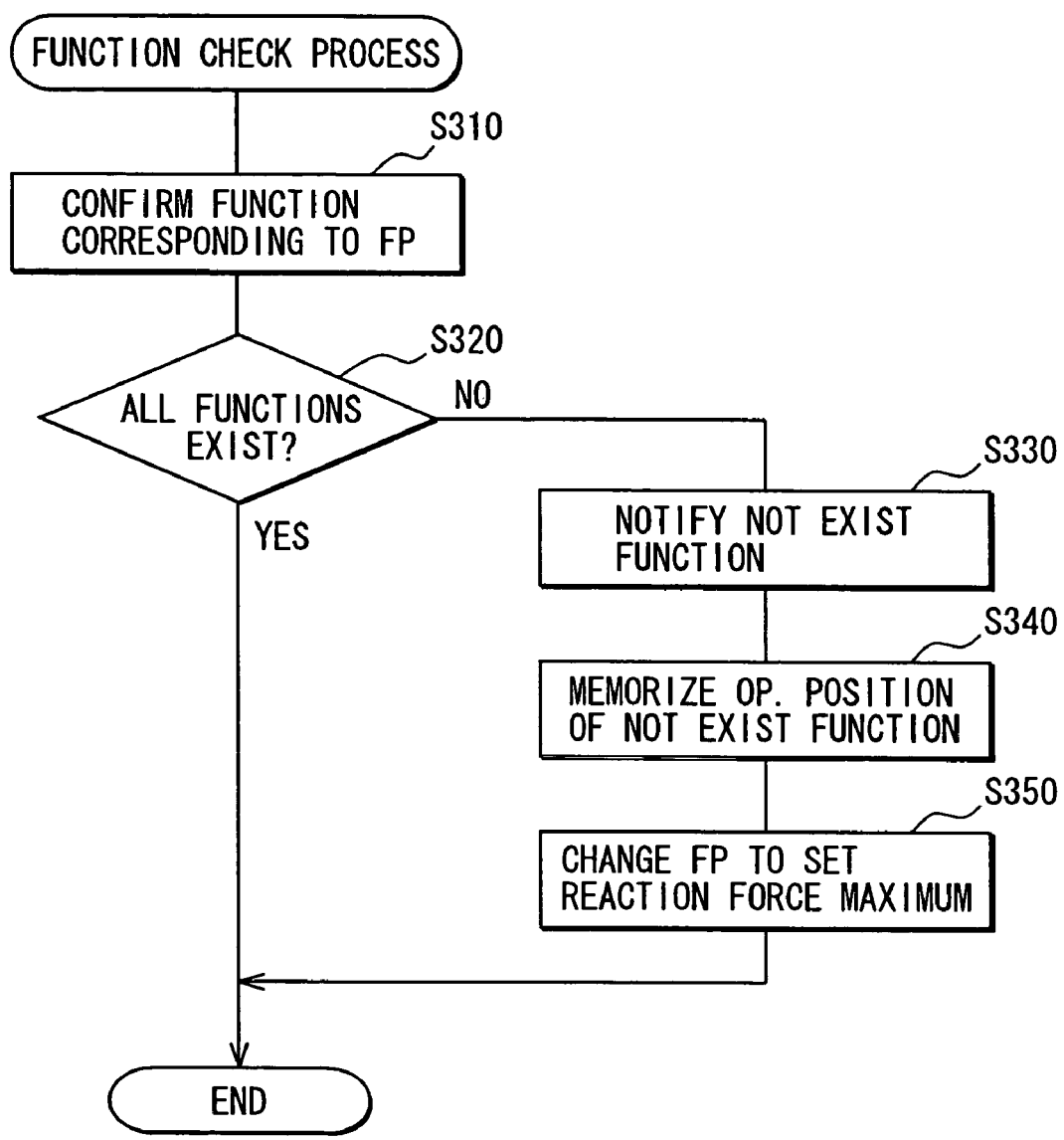
FIG. 11 is a flow chart explaining a check process of functions.

Next, the function check process to be invoked and executed in the above described force pattern memory process is explained with reference to a flow chart of FIG. 11.

The force pattern input/output portion 64 confirms existence or non-existence of in-vehicle function, which is defined in the force pattern held in the force pattern holding portion 65 at the present time (Step S310). Specifically, for example, when the force pattern held in the portion 65 currently includes a force pattern relating to operation of the navigation device, the portion 64 confirms whether the navigation device is mounted on the vehicle or not. Or, the portion 65 confirms whether a function of the navigation device (e.g., a North up function) defined in the force pattern exists in functions of the navigation device, which is mounted on the vehicle.

On the basis of a result of this confirmation, when it is confirmed that at least one of functions does not exist in the instruments of the vehicle (i.e., "No" in Step S320), the function which is defined in the force pattern held in the force pattern holding portion 63, the process proceeds to Step S330.

On the other hand, when it is confirmed that all functions exist in the instruments of the vehicle (i.e., "Yes" in Step S320), the functions which are defined in the force pattern held in the force pattern holding portion 63, the present process (i.e., the function check process) is ended, and then, it returns to the force pattern memory process, which invokes the function check process.

In Step S330, the function, which is confirmed not to exist in the instruments of the vehicle, is notified to the driver. Specifically, this notification is performed such that a voice data is inputted to the audio unit controller 23 so that audio unit outputs the voice data such as "The navigation device mounted on the vehicle does not have the North up function. Accordingly, the navigation device cannot be switched to a North up view."

Then, the operation position of the operating portion 31 corresponding to the function, which is confirmed that the function does not exist in the instruments of the vehicle, is memorized in the force pattern holding portion 63 (Step S340). Then, the force pattern held in the force pattern holding portion 63 at the present time is changed so as to maximize a reaction force of the operating portion 21 at the present operating position (Step S350). Then, the present process (i.e., the function check process) is ended, and latter steps in the force pattern memory process, which invokes the function check process, are executed.

Thus, when the force pattern is newly inputted in the manual operation device 11, the device 11 confirms existence or non-existence of the function in the instrument of the vehicle, the function being defined in the force pattern. When there is the function that does not exist in the instruments of the vehicle, the non-existence of the function is notified to the driver. Further, the force pattern is changed so as to maximize the reaction force at the operation position corresponding to the function that does not exist in the instruments. Therefore, the driver can recognize that the function defined in the force pattern newly inputted into the device 11 does not exist in the instruments of the vehicle before the driver operates the device 11. Further, since the force pattern is changed so as to maximize the reaction force at the operation position, the driver can recognize that the function corresponding to the operation position does not exist in the instruments of the vehicle even when the driver operates the operating portion 21 to the operation position.

(1) In the above embodiment, the force pattern is inputted from the cellular phone. Alternatively, the force pattern may be uploaded to a server through a communication network, and the manual operation device 11 may download the force pattern from the server. In this case, effects are similar to the above embodiment.

(2) In the above embodiment, it is confirmed whether the function defined in the newly memorized force pattern of the other vehicle exists in the instruments of own vehicle or not. Alternatively, when the function is not defined in the newly memorized force pattern of the other vehicle but another function exists in own vehicle, the other function may be added and defined in the newly memorized force pattern of the other vehicle. Specifically, a setting screen of the force pattern is shown on a display or the like in the navigation device 25. The driver changes the force pattern used at the present time to a desired force pattern. By using the changed force pattern, the other function is performed.

In this case, the force pattern corresponds to existence or non-existence of the function in the instrument of the vehicle. Therefore, usability of the manual operation device 11 is improved.

(3) In the above embodiment, the force pattern is a set of values showing a relationship between the operation position of the operating portion 21 and the control data for operating the electric motor 39a, 39b and a relationship between the operation position of the operating portion 21 and a signal for operating the instruments (e.g., the audio unit, the air conditioner and the navigation device) mounted on the vehicle. Further, the force pattern may include a control data for driving the electric motor 39a, 39b in order to notify to the user that an instruction to the operating object instrument is performed.

When the force pattern includes the above control data and, when the instruction to the operating object instrument is performed, by sending the control data to the electric motor 39a, 39b, the driver is notified from the manual operation device 11 that the instruction to the operating object instrument is performed when the driver operates the device 11. Since the force pattern can be exchanged, the driver may forget which force pattern is used at the present time. In this case, the user may feel uncomfortable in such a manner that the driver wonders "whether the instruction is practically outputted to the operating object instrument or not." Accordingly, the above described condition provides the sense of security to the user.

The encoder 41a, 41b corresponds to a detection portion, the memorizing portion 15 corresponds to a memorizing means, the communication portion 16 corresponds to a receiving means and a transmitting means in the communication function portion. The control portion 17 corresponds to the control means. Further, the below means are independent from the manual operation device 11 in the embodiment. The seat sensor 26 corresponds to a seating detection means, and the compartment camera 27 corresponds to the user identification means. Further, the electric motor 39a, 39b corresponds to the actuator.

Further, Steps S225 and S230 in the force pattern memory process executed by the control portion 17 correspond to the function to be performed by the confirmation means. Step S310 in the function check process executed by the control portion 17 corresponds to the function to be performed by the object instrument existence determination means. Furthermore, Step S330 in the function check process executed by the control portion 17 corresponds to the function to be performed by the notification means.

The above disclosure has the following aspects.

According to an aspect of the present disclosure, a manual operation device for controlling an instrument mounted on an automotive vehicle includes: an operating portion to be operated manually by a user; an actuator as a power source for applying a force to the operating portion; a detection portion for detecting an operation position of the operating portion; a memorizing element for memorizing a force pattern, which defines a relationship between the operation position of the operating portion and a control data for driving the actuator and a relationship between the operation position of the operating portion and an operation signal to be outputted from the device for controlling the instrument mounted on the vehicle; a receiving element for receiving the force pattern from an external device and for memorizing the force pattern in the memorizing portion; and a control element for reading out the force pattern memorized in the memorizing portion, for outputting the control data to the actuator on the basis of the force pattern read out from the memorizing portion and the operation position of the operating portion detected by the detection portion, and for outputting the operation signal to the instrument.

In the above device, since the force pattern can be inputted from the external device, the user can operate the manual operation device by replacing a preferable force pattern of the user when the preferable force pattern of the user is memorized in the external device. Thus, uncomfortable feeling of the user is reduced.

Alternatively, the manual operation device may further include a transmitting element for transmitting the force pattern memorized in the memorizing portion to the external device. In this case, since the force pattern can be transmitted to the external device, it is not necessary to form the force pattern in the external device. Further, the force pattern of the manual operation device, which is familiar to the user, is easily transferred to another manual operation device.

Alternatively, the external device may be a portable device. The portable device is, for example, a cellular phone, a PDA, an electric key or the like. Further, the communication may be performed by using, for example, Bluetooth Standard (which is a registered brand). In this case, since the external device is the portable device, which is usually carried by the user, the force pattern is downloaded from the portable device to the manual operation device in front of the user so that the force pattern can be used in the manual operation device ay time if the desired force pattern is preliminarily memorized in the portable device. Thus, since the force pattern is easily downloaded to the manual operation device, the utilization factor of the manual operation device is increased.

Alternatively, the manual operation device may further include a seating detection element for detecting seating of the user. The receiving element memorizes the force pattern into the memorizing element when the seating detection element detects the seating of the user. In this case, when the driver sits down the driving seat, the user can use the manual operation device with an appropriate force pattern without performing extra operation.

Alternatively, the manual operation device may further include a user identifying element for outputting identification information of the user to the control element. The memorizing element is capable of memorizing a plurality of force patterns, each of which corresponds to the user. The control element reads out and outputs the force pattern corresponding to the identification information inputted from the user identifying element among a plurality of force patterns memorized in the memorizing element. Here, "the user identifying element" is capable of, for example, inputting a user code so that the inputted code is outputted as the user identification information. Alternatively, "the user identifying element" may perform in such a manner that an image of a face of the user is captured, and a certain code is outputted as the user identification information on the basis of the identification result of the face. In these cases, the user can operate the manual operation device with an appropriate force pattern without memorizing the force pattern in the memorizing element through the communication element.

Alternatively, the manual operation device may further include: an object instrument existence determination element for determining existence or non-existence of an operation object instrument actually in the vehicle, the operation object instrument being defined in the force pattern read out by the control element from the memorizing element; and a notifying element for notifying to the user that the operation object instrument does not exist in the vehicle when the object instrument existence determination element determines that the operation object instrument does not exist in the vehicle. Here, when the force pattern used in another manual operation device is downloaded into own manual operation device, the downloaded force pattern may include a force pattern relating to the operation object instrument, which does not exist in the vehicle having the manual operation device mounted thereon. In this case, a problem occurs. Specifically, an A vehicle has a DVD player, and the force pattern for operating the DVD player is prepared. The force pattern including the force pattern for the DVD player is downloaded into the manual operation device in a B vehicle, which does not have a DVD player. At this time, the user has a maneuvering feeling similar to A vehicle when the user operates the DVD player with the manual operation device in the A vehicle. However, actually, even when the user operates the manual operation device in the B vehicle, nothing happens. However, in the above device, the user can recognizes that the operation object instrument does not exist in own vehicle. Thus, the above problem is prevented from occurring.

Alternatively, the notification performed by the notifying element is performed by appealing to sense of touch or sense of hearing. Specifically, for example, the notification is provided by sounding a buzzer, by announcing a synthesized voice having a meaning of "DVD player is not equipped in this vehicle," or by vibrating the operating portion. Thus, when the notification performed by the notifying element is performed by appealing to sense of touch or sense of hearing, the driver can recognize without averting from a front side of the vehicle that the operation object instrument does not exist in the vehicle.

Alternatively, the manual operation device may further include an object instrument existence determination element for determining existence or non-existence of an operation object instrument actually in the vehicle, the operation object instrument being defined in the force pattern read out by the control element from the memorizing element. The control element replaces a control data in the force pattern corresponding to the operation object instrument to a predetermined control data when the object instrument existence determination element determines that the operation object instrument does not exists in the vehicle. Specifically, for example, the reaction force may be increased so as not to displace the operating portion to a position, at which the operation object instrument is operated. In this case, the above described problem is prevented from occurring.

Alternatively, the manual operation device may further include a confirming element for confirming to the user whether the force pattern read out by the control element is used continuously when the user corresponding to the force pattern read out by the control means at the present time does not coincide with the user identified on the basis of the identification information outputted by the user identifying element. When the device includes the confirming element, the user can absolutely recognize that the force pattern does not correspond to the user, so that the user is protected from feeling uncomfortable feeling on a sudden.

Alternatively, the force pattern may include a feedback control data for operating the actuator in order to notify to the user that a signal is outputted to the operation object instrument. The control element outputs the feedback control data to the actuator when the signal is outputted to the operation object instrument. Here, in a case where the force pattern is capable of replacing as described above, the user feels comfortable feeling when the user is fed back that the manual operation device outputs an instruction to the operation object instrument. This is because the driver may forget which force pattern is used at the present time since the force pattern can be exchanged. In this case, the user may feel uncomfortable in such a manner that the driver wonders "whether the instruction is practically outputted to the operating object instrument." However, in the above described case, the user can operate the manual operation device with sense of security.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A manual operation device for controlling an instrument mounted on an automotive vehicle comprising:
    an operating portion to be operated manually by a user;
    an actuator as a power source for applying a force to the operating portion;
    a detection portion for detecting an operation position of the operating portion;
    a memorizing element for memorizing a force pattern, which defines a relationship between the operation position of the operating portion and a control data for driving the actuator and a relationship between the operation position of the operating portion and an operation signal to be outputted from the device for controlling the instrument mounted on the vehicle;
    a receiving element for receiving the force pattern from an external device and for memorizing the force pattern in the memorizing element;
    a control element for reading out the force pattern memorized in the memorizing element, for outputting the control data to the actuator on the basis of the force pattern read out from the memorizing element and the operation position of the operating portion detected by the detection portion, and for outputting the operation signal to the instrument; and
    a transmitting element for transmitting the force pattern memorized in the memorizing element to the external device.

2. The manual operation device according to claim 1, wherein
    the external device is a portable device.

3. The manual operation device according to claim 1, further comprising:
    a seating detection element for detecting seating of the user, wherein
    the receiving element memorizes the force pattern into the memorizing element when the seating detection element detects the seating of the user.

4. The manual operation device according to claim 1, further comprising:
    a user identifying element for outputting identification information of the user to the control element, wherein
    the memorizing element is capable of memorizing a plurality of force patterns, each of which corresponds to the user, and
    the control element reads out and outputs the force pattern corresponding to the identification information inputted from the user identifying element among a plurality of force patterns memorized in the memorizing element.

5. A manual operation device for controlling an instrument mounted on an automotive vehicle comprising:
    an operating portion to be operated manually by a user;
    an actuator as a power source for applying a force to the operating portion;
    a detection portion for detecting an operation position of the operating portion;
    a memorizing element for memorizing a force pattern, which defines a relationship between the operation position of the operating portion and a control data for driving the actuator and a relationship between the operation position of the operating portion and an operation signal to be outputted from the device for controlling the instrument mounted on the vehicle;
    a receiving element for receiving the force pattern from an external device and for memorizing the force pattern in the memorizing element;
    a control element for reading out the force pattern memorized in the memorizing element, for outputting the control data to the actuator on the basis of the force pattern read out from the memorizing element and the operation position of the operating portion detected by the detection portion, and for outputting the operation signal to the instrument;
    an object instrument existence determination element for determining existence or non-existence of an operation object instrument actually in the vehicle, the operation object instrument being defined in the force pattern read out by the control element from the memorizing element; and
    a notifying element for notifying to the user that the operation object instrument does not exist in the vehicle when the object instrument existence determination element determines that the operation object instrument does not exist in the vehicle.

6. The manual operation device according to claim 5, wherein
    notification performed by the notifying element is performed by appealing to sense of touch or sense of hearing of the user.

7. A manual operation device for controlling an instrument mounted on an automotive vehicle comprising:
    an operating portion to be operated manually by a user;
    an actuator as a power source for applying a force to the operating portion;
    a detection portion for detecting an operation position of the operating portion;
    a memorizing element for memorizing a force pattern, which defines a relationship between the operation position of the operating portion and a control data for driving the actuator and a relationship between the operation position of the operating portion and an operation signal to be outputted from the device for controlling the instrument mounted on the vehicle;
    a receiving element for receiving the force pattern from an external device and for memorizing the force pattern in the memorizing element;
    a control element for reading out the force pattern memorized in the memorizing element, for outputting the control data to the actuator on the basis of the force pattern read out from the memorizing element and the operation position of the operating portion detected by the detection portion, and for outputting the operation signal to the instrument; and
    an object instrument existence determination element for determining existence or non-existence of an operation object instrument actually in the vehicle, the operation object instrument being defined in the force pattern read out by the control element from the memorizing element, wherein
    the control element replaces a control data in the force pattern corresponding to the operation object instrument to a predetermined control data when the object instrument existence determination element determines that the operation object instrument does not exists in the vehicle.

8. A manual operation device for controlling an instrument mounted on an automotive vehicle comprising:
an operating portion to be operated manually by a user;
an actuator as a power source for applying a force to the operating portion;
a detection portion for detecting an operation position of the operating portion;
a memorizing element for memorizing a force pattern, which defines a relationship between the operation position of the operating portion and a control data for driving the actuator and a relationship between the operation position of the operating portion and an operation signal to be outputted from the device for controlling the instrument mounted on the vehicle;
a receiving element for receiving the force pattern from an external device and for memorizing the force pattern in the memorizing element; and
a control element for reading out the force pattern memorized in the memorizing element, for outputting the control data to the actuator on the basis of the force pattern read out from the memorizing element and the operation position of the operating portion detected by the detection portion, and for outputting the operation signal to the instrument;
a user identifying element for outputting identification information of the user to the control element, wherein
the memorizing element is capable of memorizing a plurality of force patterns, each of which corresponds to the user, and the control element reads out and outputs the force pattern corresponding to the identification information inputted from the user identifying element among a plurality of force patterns memorized in the memorizing element; and
a confirming element for confirming to the user whether the force pattern read out by the control element is used continuously when the user corresponding to the force pattern read out by the control element at the present time does not coincide with the user identified on the basis of the identification information outputted by the user identifying element.

9. The manual operation device according to claim 1, wherein
the force pattern includes a feedback control data for operating the actuator in order to notify to the user that the operation signal is outputted to the operation object instrument, and
the control element outputs the feedback control data to the actuator when the operation signal is outputted to the operation object instrument.

10. The manual operation device according to claim 1, wherein
the external device is a cell phone, and
the receiving element receives the force pattern from the cell phone.

11. The manual operation device according to claim 1, wherein
the external device is a server,
the receiving element receives the force pattern from the server on an internet so that the force pattern is downloaded, and
the transmitting element uploads the force pattern in the memorizing element to the server.

* * * * *